A. O. MORGAN.
Tire Tightener.
No. 85,235. Patented Dec. 22, 1868.
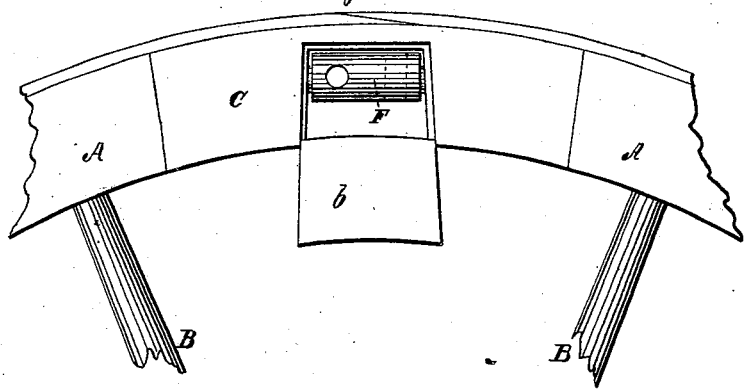
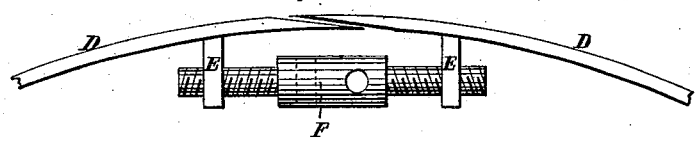
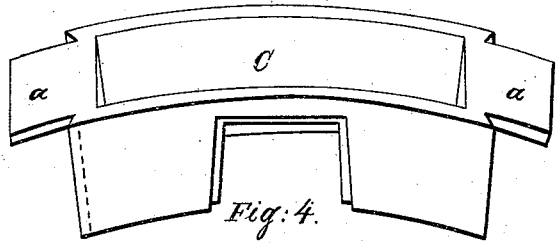
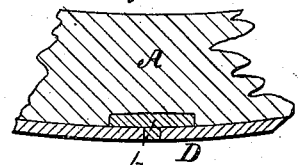

United States Patent Office.

A. O. MORGAN, OF NASHVILLE, OHIO, ASSIGNOR TO HIMSELF AND WILLIAM B. LOLLER, OF SAME PLACE.

Letters Patent No. 85,235, dated December 22, 1868.

IMPROVED TIRE-TIGHTENER.

The Schedule referred to in these Letters Patent and making part of the same.

*To all whom it may concern:*

Be it known that I, A. O. MORGAN, of Nashville, in the county of Holmes, and in the State of Ohio, have invented certain new and useful Improvements in "Tightening Tires;" and do hereby declare that the following is a full, clear and exact description thereof, reference being had to the accompanying drawings, and to the letters of reference marked thereon.

The nature of my invention consists in an improved method for tightening tires on wheels; and In order to enable others skilled in the art to make and use the same, I will now proceed to describe its construction and operation, referring to the annexed drawings, which form a part of this specification, and in which—

Figure 1 is a section of the wheel showing the metal felloe;

Figure 2 is a section of the tire, with device for tightening the same;

Figure 3 is a perspective of the metal felloe; and

Figure 4 is a section of the wheel directly opposite the metal felloe, showing the manner of holding the tire in position.

A A represent the wooden felloes of a wheel, and B B, the spokes.

At one point of the wheel, (represented in fig. 1,) a a metal felloe, C, is substituted.

This metal felloe is a shell or casing, as shown in fig. 3, open at the top, but having, at the ends, tongues *a a*, which are secured to the wooden felloes A A, being sunk therein, so as to present an even surface.

In the centre of the inner or lower side is an aperture in the metal felloe C, also one on the side, both of which apertures may be closed by dovetailed lids, *b*, as seen in fig. 1.

The tire D is provided, near its ends, on its under side, with lugs, E E, cast or forged on the same, and its ends are cut bevelled, as shown in fig. 2, so as to slide on top of each other.

Through the lugs E E passes a screw, F, which in its centre forms a round bar, with several holes for the insertion of a wrench, said round part of the screw being about the length of the apertures in the metal felloe.

The screw-ends of the screw F are turned, one right and the other left, so that when the lugs E E are placed, one on each end of the screw F, by turning the screw in one direction the lugs are brought closer together, and when turned in the other direction the lugs are brought further apart.

On the outside of the wooden felloe, directly opposite the centre of the metal felloe, is an oblong slot, shown in fig. 4, in which slot is placed an oblong projection, *d*, on the inside, in the centre of the tire D.

The screw F is placed in the lugs E E, and the tire D is put on the wheel in such a manner that the projection *d* on its centre fits in its corresponding slot on the wheel, and the lugs E E, with the screw F, are placed inside the metal felloe C. Then, by turning the screw F, through the apertures described, by means of a wrench, the tire will be tightened on the wheel, both ends of the tire moving inwards, on account of the projection *d*, which holds the tire in the centre.

The advantages of this device are too obvious to need any mention.

Anybody who has had the trouble of cutting and re-setting, tightening and loosening the tires of his carriage-wheels, will at once see the beauty hereof; how tires can be tightened or loosened at will in a moment's time, and without having to send away to the shop, and going to any expense for the same.

I am aware that a right and left-hand-screw, used for tightening tires, is known.

What I claim, is—

The tire A, bevelled at each end, as shown, and provided with the oblong projection *d*, in combination with the metallic box C, having dovetailed tongues *a a*, and sliding door *b*, shielding the screw F, all substantially as set forth.

In testimony that I claim the foregoing, I have hereunto set my hand, this 21st day of September, 1868.

A. O. MORGAN.

Witnesses:
J. H. HAGAR,
E. J. DARBY.